June 27, 1967 R. A. KIRKPATRICK 3,328,715

AMPLIFIER BIAS CONTROL CIRCUIT

Filed June 24, 1964

INVENTOR.
RICHARD A. KIRKPATRICK
BY
Kenway, Jenney & Hildreth
ATTORNEYS

United States Patent Office 3,328,715

Patented June 27, 1967

3,328,715

AMPLIFIER BIAS CONTROL CIRCUIT

Richard A. Kirkpatrick, Melrose, Mass., assignor to National Company, Inc., Malden, Mass., a corporation of Massachusetts Filed June 24, 1964, Ser. No. 377,670
7 Claims. (Cl. 330—135)

Figures 1, 2:
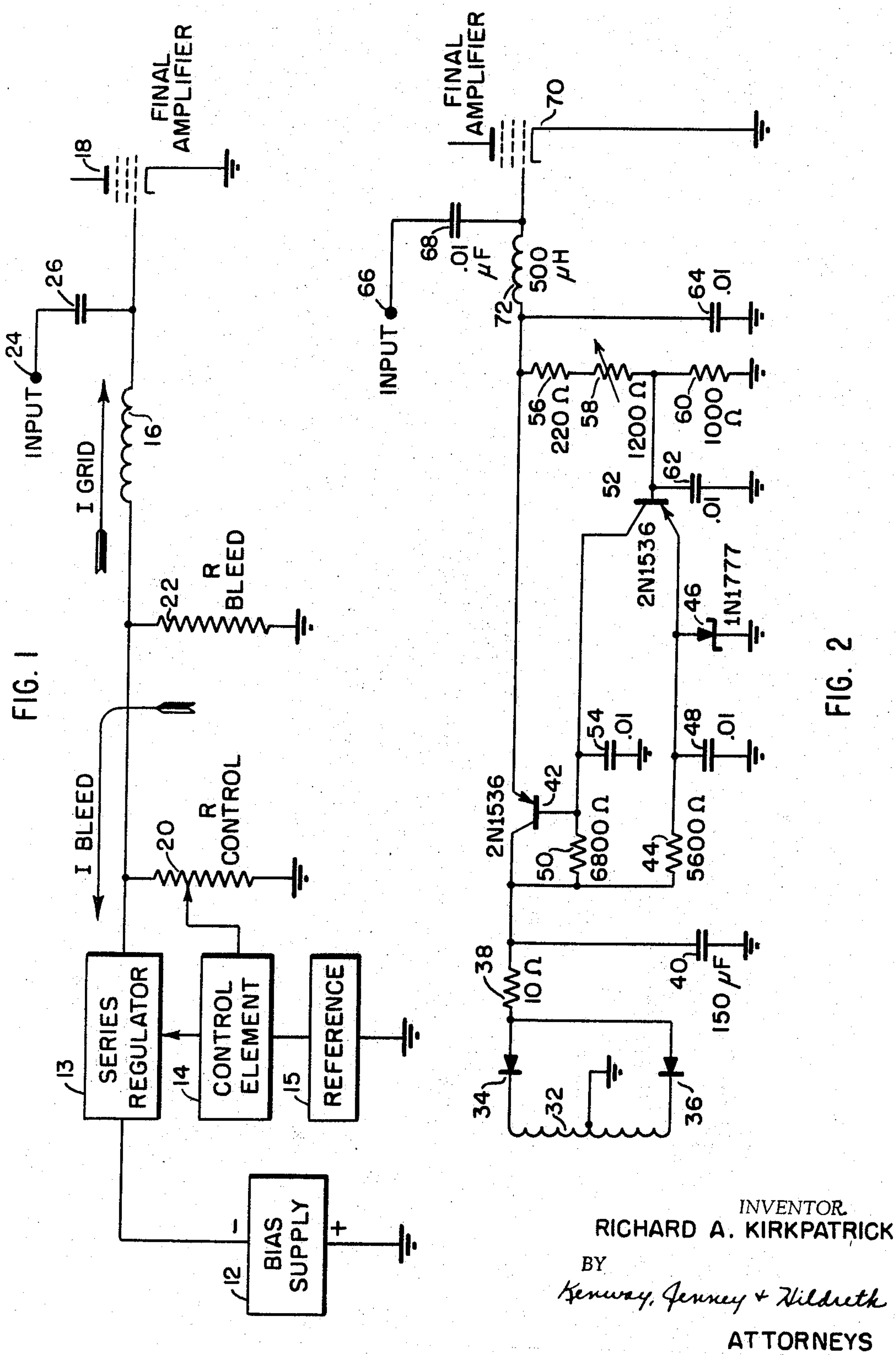

This invention relates in general to amplifiers and in particular to an amplifier circuit which operates as a class $AB_2$ amplifier, while retaining the advantages of a class $AB_1$ amplifier.

Amplifiers are frequently distinguished in the art by their class of operation. Class A operation, class B operation and class AB operation are all well known. The classes are further broken down into subclasses. For example, class AB operation is subdivided into class $AB_1$ and class $AB_2$ operation. The subscript "1" indicates that no grid current flows in any part of the cycle of the amplifier, and the subscript "2" indicates that grid current does flow for at least a part of the cycle. It may be noted parenthetically that the subscript is seldom used in connection with class B operation because flow of grid current is the normal condition.

As might be inferred from the classification, even when a class $AB_1$ amplifier is overdriven, increased grid current does not cause correspondingly increased plate current. The mechanism has been discussed at great length in the literature, and it may be briefly restated as being the result of inherent self-limiting. By this is meant that additional negative bias voltage is developed in the typically unregulated bias supply by the grid current which flows as the amplifier is overdriven. Because the effect of increased positive signal on the grid and the development of increased negative bias on the grid are self-cancelling, no excessive plate current flows in the amplifier.

On the other hand, class $AB_2$ amplifiers do not enjoy any such inherent self-limiting. Class $AB_2$ amplifiers are more efficient and are capable of higher operating power levels, but if, for example, the amplifier is mis-tuned, excessive input can and does result in destructively high screen and plate currents. It is with a system which combines the high efficiency and high operating power levels of class $AB_2$ amplifiers with the inherent self-limiting of class $AB_1$ operation that the present invention is primarily concerned and has as its principal object.

Although the present invention has broad fields of application and should not be limited to any specific use, it has been found of great value in amateur radio. The legal amateur limit of 1000 watts average input and 2000 watts peak envelope power input imposes stringent conditions on the design of final amplifiers to be used by amateurs. Commonly, the exciters used will deliver about 100 watts of peak envelope power output. With such driving power available, either class $AB_1$ or class $AB_2$ amplifiers may be employed.

However, with class $AB_1$ operation, the grid supply is deliberately poorly regulated and has a relatively high output impedance. Then, as noted generally above, a variation in microphone gain, a sudden loud noise reaching the microphone or other overdriving factor will not cause trouble. The increased signal tending to make the amplifier draw grid current also causes the development of increased bias voltage. The two effects cancel each other, and plate and screen currents cannot increase beyond the point they would reach in C.W. operation with the drive set to raise the final amplifier grids to just zero volts.

In class $AB_2$ operation, which is desirable because more power can be put into the final amplifier tubes and greater efficiency can be obtained, the grid bias must be regulated in order that the grid can be driven positive without increasing grid voltage from the bias supply. The existence of the regulation, of course, destroys the self-limiting found in class $AB_1$ operation, and as power input increases, a destructive level is quickly reached.

Thus, it is plain that circumstances exist, as in the case of class $AB_1$ operation, where regulation is undesirable and, as in the case of class $AB_2$ operation, where regulation is needed for proper operation but unwanted under conditions of overdrive. The present invention resides in a circuit which functions to regulate an amplifier bias supply only up to the point where the voltage on the final amplifier grid reaches a predetermined value, thus providing the benefits of both class $AB_1$ and class $AB_2$ operation.

For a better understanding of the present invention, together with further objects, advantages and features, reference should be made to the following detailed description which should be read in conjunction with the appended drawing, in which:

FIG. 1 is a block diagram of a circuit built in accordance with the present invention; and FIG. 2 is a schematic of a preferred embodiment of the present invention.

In FIG. 1, there is illustrated a bias supply 12, having its positive side grounded and providing a negative output to a series regulator 13. Both the bias supply and the regulator may be conventional in design, the regulator preferably including a standard control element 14 and a reference source 15.

The regulator 13 is connected, for example, through an R.F. choke 16, to the control grid of a final amplifier 18. The regulator is also connected to a control resistor 20 and a bleed resistor 22, which are in parallel across the output of the regulator. The control resistor is actually a potentiometer having a tap which is connected back to the control element of the regulator.

The normal output of the regulator 13 is a negative voltage, inasmuch as the bias supply 12 provides such a voltage to it. In the absence of any other components, with such a negative voltage present, there would be no possible grid current flow in the final amplifier tube nor would the regulator be operative. However, the bleed resistor 22 connected to the regulator output terminal provides a path for the flow of current in the direction indicated by the arrow legended I BLEED. The regulator is thus caused to operate and, as a result, the voltage established at the grid of the final amplifier is less negative than that of the bias supply by an amount determined by the details of the regulator circuit. Parenthetically, it is noted that the bleed resistor can be eliminated as a separate element if the value of the control resistor 20 is properly chosen.

Provision is made for applying a signal to the grid of the final amplifier through an INPUT terminal 24 and a coupling capacitor 26. The action of the bleeder current is of no operative interest here unless and until the signal so applied is of sufficient amplitude to drive the grid positive. When the grid is driven positive, however, beyond the established bias voltage, a grid current is generated. The polarity of the grid current, indicated by the arrow legended I GRID, is opposite to that of the bleed current, and the flow of grid current tends to cause a change in the grid bias voltage. This change is sensed by the regulator which reduces its current flow to overcome the change. With the reduction of current flow in the regulator, the change is overcome.

When, however, grid current increases until it equals bleeder current, which occurs when a signal of sufficient magnitude is applied to the grid, operation of the regulator ceases because there is no longer a current flow through the regulator. The effective impedance of the bias supply is then extremely high, and grid bias voltage developed by the flow of grid current will increase in proportion to any increase of a signal input. Thus, the limiting action associated with class $AB_1$ amplifiers comes into play, but not until a predetermined bias point above zero volts is reached. The precise point is established by adjustment of the bleed current.

A specific circuit for accomplishing the objectives of the invention is schematically illustrated in FIG. 2. The bias supply may be of conventional design, including a grounded centertap transformer 32 and rectifiers 34 and 36 for full-wave rectification. An R.C. filter composed of the resistor 38 and the condenser 40 is connected to the rectifier output.

The regulator has as its major element the transistor 42, the collector of which is directly connected to the filtered output of the rectifier. Also connected to the same point through a resistor 44 is a Zener diode 46 which is conventionally bypassed by a condenser 48. The base of the transistor 42 is returned to the collector through a resistor 50. Connected directly to the base of the transistor 42 is the collector of a second transistor 52. The junction of the base of the transistor 42 and the collector of the transistor 52 is bypassed to ground by a condenser 54. The emitter of transistor 52 is directly connected to the Zener diode 46.

The bleed and control resistors are combined in a divider composed of a fixed resistor 56, a variable resistor 58, and a second fixed resistor 60. The base of the transistor 52 is bypassed to ground by a condenser 62 and is directly connected to the junction of the variable resistor 58 and the fixed resistor 60 of the divider. The output of the regulator circuit is taken from the junction of the emitter of the transistor 42 and the divider. This output is also bypassed to ground by means of a condenser 64. Input signals are applied at the terminal 66 through a condenser 68 to the grid of the final amplifier 70. An R.F. chock 72 is connected between the regulator output and the signal input circuit as is conventional.

The Zener diode and its associated components serve as the reference element for the regulator. The reference voltage so determined appears upon the emitter of the transistor 52.

The variable resistor may be adjusted to provide a bleed current of, for example, 20 ma. Under these conditions, there is a regulated bias voltage present between the emitter of the regulating transistor 42 and ground. In addition to appearing upon the grid of the final amplifier 70, the bias voltage is across the divider composed of the resistors 56, 58 and 60. Regulating action is such that if the voltage increases slightly in a negative direction, the base of the control transistor 52 also goes more negative. This tends to increase the collector current through the transistor 52, which, in turn, makes the base of the control transistor 42 less negative. The base current in the transistor 42 then decreases and the output voltage also decreases. As the output voltage goes less negative, it counteracts the original change which was in a more negative direction. Should the original change be in a less negative direction, a reverse sequence of events occurs producing a more negative output to overcome or counteract the original change.

The function of the Zener diode is simply to provide a reference for comparison with the output voltage from the power supply. The resistor 44 is placed in series with the Zener diode 46 because the variations in control current through the transistor 42 can be substantial and the resistor tends to minimize these variations and their effect upon the Zener diode.

However, when a signal of sufficient magnitude to draw grid current in excess of the 20 ma. regulator setting is applied to the input terminal, current ceases to flow through the regulator, and its action also ceases. Grid limiting action then ensues. The bias voltage increases in proportion to the applied signal magnitude. The various bypass condensers such as 40, 48, 54, 62 and 64 are provided to bypass R.F. energy which may be picked up by the various leads and components of the regulator.

The variable resistor 58 may be adjusted to accommodate the regulator to various different final amplifier tubes. Tubes which operate with high bias require a relatively large resistance which may be provided by the variable resistor. Of course, tubes which require less bias may also be accommodated by variation of the same resistor. It has been noted in practice that bleed current need be varied only slightly to provide satisfactory operation even though tubes having widely different bias requirements are used.

What has been disclosed constitutes a preferred embodiment of the present invention. However, many alternatives will suggest themselves to those skilled in the art upon a reading of the foregoing specification, and such alternatives are believed to be within the purview of the present invention which should be limited only by the spirit and scope of the appended claims.

What is claimed is:

1. In an amplifier having a grid to which a signal is applied through a coupling capacitor and a negative bias supply for said grid, a control circuit comprising a series regulator connected between said bias supply and said grid, said regulator providing a substantially constant bias voltage on said grid when said signal is less than a predetermined magnitude, and means rendering said regulator ineffective when said signal exceeds said predetermined magnitude, the voltage on said grid thereafter varying as a function of the magnitude of the signal applied thereto.

2. In an amplifier having at least a grid to which a signal is applied through a coupling capacitor, the combination of a source of negative grid bias voltage, a regulator connected to said source and to said grid, means for normally operating said regulator to maintain said grid bias voltage at a substantially fixed value, and means responsive to an increase of said signal beyond a predetermined value for discontinuing the operation of said regulator to maintain said grid bias voltage substantially fixed.

3. In an amplifier having at least a grid to which a signal is applied through a coupling capacitor, the combination of a source of negative grid bias voltage, a series regulator connected to said source and having an output terminal, a bleed resistor connected to the output terminal of said regulator, current of a first predetermined value flowing through said bleed resistor and said regulator to permit operation of said regulator, and means connecting the output terminal of said regulator to said grid, whereby when said current flowing from said regulator flows to said grid upon a predetermined increase of said signal applied to said grid equals said predetermined current, said regulator ceases to be effective.

4. A bias control circuit for an amplifier, said amplifier having at least a grid to which input signals are applied through a coupling capacitor, comprising a source of negative grid bias voltage, a regulator connected to said source for normally maintaining said grid at a substantially fixed value, means including a bleed resistor forming a path for current flow through said regulator to permit operation thereof, and means connecting said bleed resistor to said grid to divert said current flow from said regulator to render said regulator inoperative when said input signals exceed a predetermined value.

5. A bias control circuit for an amplifier, said amplifier having at least a grid to which input signals are applied through a coupling capacitor, comprising a source of negative grid bias voltage, a regulator connected between said source and said grid, a bleed resistor connected to the junction of said regulator and said grid, means for causing a current normally to flow through said bleed resistor and said regulator to establish a predetermined bias on said grid, said current flowing through said bleed resistor to said grid when the peak value of said input signals exceed said predetermined bias, said regulator becoming ineffective when said current flowing to said grid equals the current flowing through said bleed regulator.

6. A bias control circuit as defined in claim 5, including means for varying the resistance of said bleed resistor to vary said predetermined value.

7. In a vacuum tube amplifier having a grid to which signals are applied through a coupling capacitor and a cathode connected to a source of reference potential, a grid bias control circuit comprising in combination, (1) a source of bias voltage which is negative with respect to said reference potential, (2) a series regulator connected between said source and said grid and (3) a bleed resistor connected between said grid and said source of reference potential, said series regulator establishing a predetermined bias on said grid in the absence of input signals by establishing current through said bleed resistor at a first value, said current through said bleed resistor being diverted to said grid when the peak value of said input signals exceeds said predetermined bias and said regulator becoming inoperative when the peak value of said input signals is sufficiently great so that the grid current equals the first value of current through said bleed resistor.

References Cited

UNITED STATES PATENTS

| | | | |
|---|---|---|---|
| 1,863,568 | 6/1932 | Francis | 330—204 X |
| 2,782,340 | 2/1957 | Siskel | 328—267 |
| 3,189,842 | 6/1965 | Quittner | 330—136 X |
| 3,201,606 | 8/1965 | Mamon. | |
| 3,235,786 | 2/1966 | Gaskill. | |

ROY LAKE, *Primary Examiner.*

F. D. PARIS, S. H. GRIMM, *Assistant Examiners.*